United States Patent [19]

Locher et al.

[11] Patent Number: 4,499,412
[45] Date of Patent: Feb. 12, 1985

[54] REGULATING DEVICE FOR AN ELECTROMAGNETIC CONTROL ELEMENT, ESPECIALLY IN AN INTERNAL COMBUSTION ENGINE WITH AUTO-IGNITION

[75] Inventors: Johannes Locher, Stuttgart; Dieter Schaller, Neubulach, both of Fed. Rep. of Germany

[73] Assignee: Robert Bosch GmbH, Stuttgart, Fed. Rep. of Germany

[21] Appl. No.: 426,329

[22] Filed: Sep. 29, 1982

[30] Foreign Application Priority Data

Mar. 4, 1982 [DE] Fed. Rep. of Germany ....... 3207863

[51] Int. Cl.³ .............................................. G05B 11/42
[52] U.S. Cl. .................... 318/592; 123/357; 318/609; 318/610; 361/152
[58] Field of Search ............... 361/152, 154; 123/357, 123/479; 328/142; 318/592, 609, 610

[56] References Cited

U.S. PATENT DOCUMENTS

| | | | |
|---|---|---|---|
| 3,757,750 | 9/1973 | Ohtani | 123/357 |
| 3,965,877 | 6/1976 | Adey | 123/357 |
| 4,174,694 | 11/1979 | Wessel et al. | 123/357 |

Primary Examiner—William H. Beha, Jr.
Attorney, Agent, or Firm—Edwin E. Greigg

[57] ABSTRACT

A regulating device for an electromagnetic control element, especially for an internal combustion engine with auto-ignition, is proposed in which a non-linear regulator with preferably a PD characteristic is coupled with a pulse regulator, preferably a two-point regulator with PID characteristic. Of special advantage is the interposition of a limiting device, which allows an increase in the D portion of the non-linear regulator, while at the same time suppressing interference. This results in an excellent control behavoir, especially in the face of small control deviations and in a control element or control circuit afflicted with friction and/or (magnetic) hysteresis.

12 Claims, 1 Drawing Figure

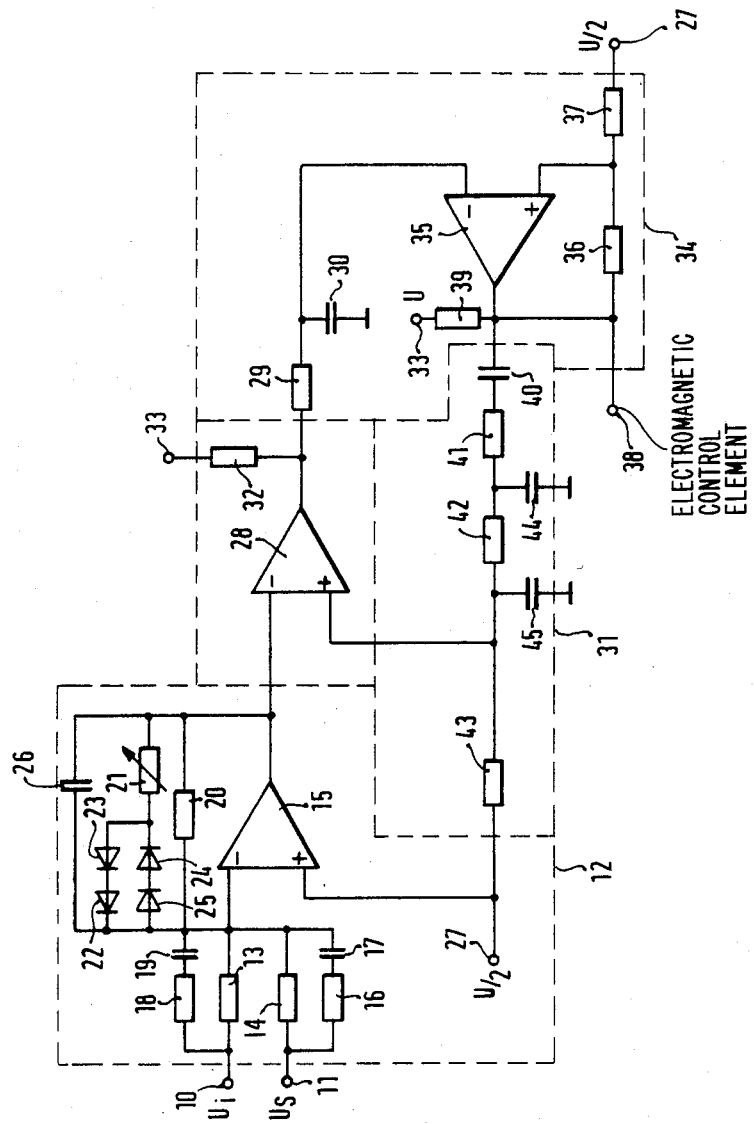

REGULATING DEVICE FOR AN ELECTROMAGNETIC CONTROL ELEMENT, ESPECIALLY IN AN INTERNAL COMBUSTION ENGINE WITH AUTO-IGNITION

BACKGROUND OF THE INVENTION

The invention is based on a regulating device for an electromagnetic control element for use especially with an internal combustion engine. Such a regulating device is already known from German Offenlegungsschrift No. 30 42 917 and there it is used to determine the amount of fuel to be injected in Diesel engines through the position of an adjusting rod by means of a regulated electromagnetic control device. In the known control device, as well as in general, a constant problem is posed by the ever increasing demands on the exactitude of such a control element, especially for fuel metering, and especially in cases where it becomes necessary to regulate comparatively small control deviations in a control circuit affected by friction.

OBJECT AND SUMMARY OF THE INVENTION

The regulating device in accordance with the present invention has the advantage that an additional improvement in the quality of the regulating process is achieved in comparison with the known state of the art. This is especially true for small control deviations and with a control circuit affected by friction and/or magnetic hysteresis. A further advantage lies in the very simple circuit design.

By means of the provision of a second regulator switched behind a non-linear regulator, advantageous further developments and improvements of the regulating device described hereinafter are possible. The addition of a limiting device has been shown to be especially advantageous, limiting the switching frequency of the second, pulse regulator. This permits an increase of the "D" portion of the first regulator with simultaneous interference suppression.

The invention will be better understood and further objects and advantages thereof will become more apparent from the ensuing detailed description of a preferred embodiment taken in conjunction with the drawings.

BRIEF DESCRIPTION OF THE DRAWINGS

An exemplary embodiment of the present invention is shown in the drawing and further explained in the ensuing description. The single figure shows a switching arrangement of the exemplary embodiment.

DESCRIPTION OF THE PREFERRED EMBODIMENT

Two inputs 10, 11 of a non-linear PD regulator 12 are supplied with a voltage Ui dependent on the actual value and a voltage Us dependent on the set-point value. The generation of these voltages by means of mechanical/electrical converters or set-point voltage suppliers, such as potentiometers, etc., conforms to the general state of the art (see, for example, U.S. Pat. Nos. 4,304,204 and 4,327,683) and is therefore not addressed in detail. Only one or several regulators are therefore shown of a complete, closed control circuit.

Both inputs 10, 11 are connected by way of two resistors 13, 14 to an inverting input of an operational amplifier 15. The in-series arrangement of a resistor 16 with a capacitor 17 is switched in parallel to the resistor 14. Accordingly, the in-series arrangement of a resistor 18 with a capacitor 19 is also switched in parallel to the resistor 13. The output of the operational amplifier 15 is fed back by way of three parallel branches to the inverting input. The first branch contains a resistor 20, the second branch consists of the in-series arrangement of an adjustable resistor 21 with a diode array 22 to 25, consisting of two parallel branches. Each of these two branches contains two in-series arranged diodes 22, 23 or 24, 25, wherein the diodes in the two branches are switched antiparallel. The third feed-back branch consists of a capacitor 26. The non-inverting input of the operational amplifier 15 is connected with a terminal 27 holding a voltage U/2 of, for instance, 2.5 volts. In its basic construction the PD regulator described is known, wherein, depending on the kind of non-linearity desired, the construction of the feed-back branch and the input switch arrangement can be varied.

The output of the operational amplifier 15 is connected with the inverting input of another operational amplifier functioning as comparator 28 and forming the two-point member of a second, pulse regulator. The output of the comparator 28 is further connected via a resistor 32 to a terminal 33 which receives a voltage U of, for instance, 5 Volts, as well as via an RC member 29, 30 with the inverting input of a second comparator 35, the non-inverting input of which is connected via a resistor 36 with its output as well as via a resistor 37 with the terminal 27. The output of the comparator 35 constitutes (via a terminal 38) at the same time the control output for a final control element end step, not further shown but known in the art (see, for example, element 28 in U.S. Pat. No. 4,265,200 or element 51 in U.S. Pat. No. 4,040,394). Furthermore the output of the comparator 35 is connected via a resistor 39 with the terminal 33. Finally, it is connected via the in-series arrangement of a capacitor 40 with two resistors 41, 42 to the non-inverting input of the comparator 28 as well as a resistor 43 to the terminal 27. The two resistors 41, 42, together with two capacitors 44, 45, connected with ground, form two RC members. Parts 40 to 45 form a feed-back switch arrangement 31 for the comparator 28 and parts 29, 30 and 35 to 39 a limiting device 34 for the switching frequency of the pulsing, which essentially constitutes a frequency filter.

The mode of operation of the exemplary embodiment shown in the drawing consists of the non-linear PD regulator 12 having a steep characteristic at the balancing point, but having a level characteristic elsewhere. The limiting device 34 suppresses, through frequency limitation, a possibly too high switching frequency. Because of its non-ideal I-behavoir and its pulse frequency changing with control output, the two point regulator 28, 31 with a PID characteristic proves to be advantageous in relation to the friction present. Furthermore, it directly supplies the necessary current pulse for the control element, especially for the control magnet. The feed-back circuit portion 31 determines the transmission behavior of the two-point regulator. The capacitor 40 acts as I-member and the two RC-members 41, 44 or 42, 45, used as delay members, act as D-member. The resistor 43 makes possible the outflow of the current from the non-inverted input of the comparator 28 (P-behavior). The two-point regulator 28, 31 is overridden by the first regulator 12 during larger control deviations because of the non-linearity between them and goes essentially into operation only during small control deviations.

The combination of a non-linear PD-regulator and a two-point regulator with a PID characteristic does constitute the preferred embodiment of the present invention; however, it is understood that variations in the regulator characteristics can be included within the scope of the present invention.

Furthermore, the present invention is not limited to internal combustion engines, but can be used in all such occasions where an actual/set point comparison is to be made and the respective deviation is to be reduced towards zero. The advantages of the present invention are always apparent in cases where a good control behavior is desired, especially with small control deviations and with control elements afflicted with friction and/or with (magnetic) hysteresis.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A regulating device for an electromagnetic control element for regulating an actual value of said electromagnetic control element corresponding to the position of said control element, especially in an internal combustion engine with auto-ignition, comprising, a first, non-linear regulator producing a first output signal for regulating said actual value to a desired value, and a second pulse regulator receiving said first output signal for producing a second output signal and regulating said second output signal to said first output signal for controlling said electromagnetic control element.

2. A regulating device according to claim 1, wherein the first, non-linear regulator is a PD-regulator (12).

3. A regulating device in accordance with claims 1 or 2, wherein the pulse regulator (28, 31) is a two-point regulator.

4. A regulating device in accordance with claim 3, wherein the two-point regulator (28, 31) comprises a comparator (28) having a feed-back circuit (31) for determining the transmission behavior of the two-point regulator.

5. A regulating device according to claim 3, wherein the pulse regulator (28, 31) comprises a limiting means (34) for limiting the switching frequency of the clock regulator.

6. A regulating device in accordance with claim 5, wherein the limiting means (34) is a frequency filter.

7. A regulating device according to claim 1, wherein the second regulator (28, 31) exhibits, preferably, a PID behavior.

8. A regulating device according to claim 4, wherein the feed-back circuit (31) comprises a capacitor (40).

9. A regulating device according to claim 4, wherein the feed-back circuit (31) comprises a delay means (41, 44 or 42,45).

10. A regulating device in accordance with claim 9, wherein the delay means comprises at least one RC-member (41, 44 or 42, 45).

11. A regulating device according to claim 4, wherein the feed-back circuit comprises a resistor (43), whereby the outflow of current from the feed-back circuit (31) of the comparator (28) is assured.

12. A regulating device according to claim 1, wherein said first regulator comprises means for establishing said non-linearity, whereby said second regulator increasingly regulates said second output signal during small deviations of said actual value and said desired value.

* * * * *